Aug. 15, 1961   B. E. SCHANER   2,996,443
FISSILE MATERIAL AND FUEL ELEMENTS FOR NEUTRONIC REACTORS
Filed May 16, 1958
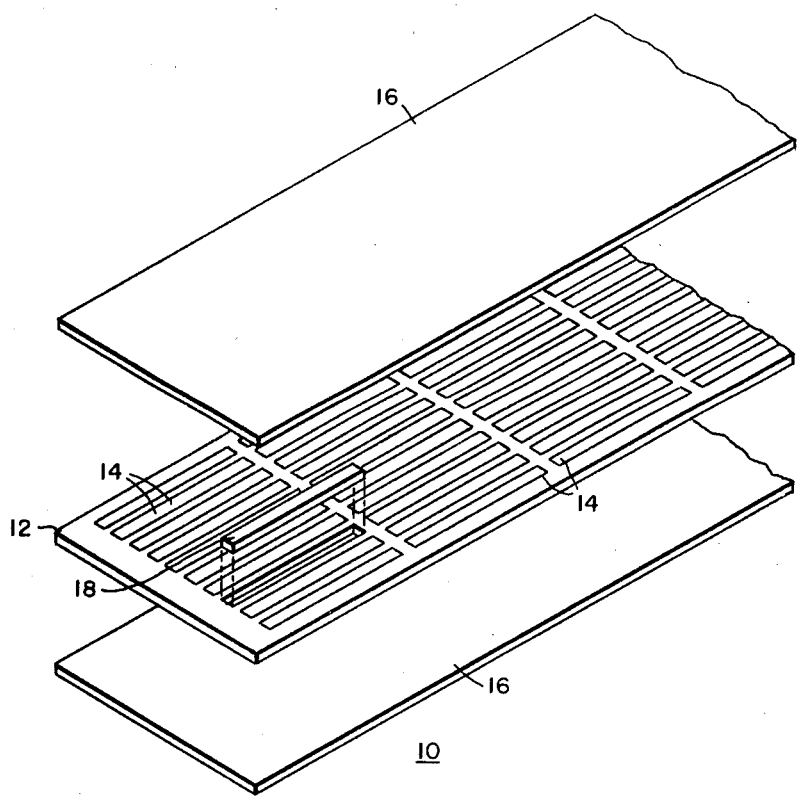
WITNESSES
John E. Heasley Jr.
Charles T. Board
INVENTOR
Burton E. Schaner
BY
Frederick Shapoe
ATTORNEY

United States Patent Office 2,996,443
Patented Aug. 15, 1961

2,996,443
FISSILE MATERIAL AND FUEL ELEMENTS FOR NEUTRONIC REACTORS
Burton E. Schaner, Mount Lebanon, Pa., assignor, by mesne assignments, to the United States of America as represented by the United States Atomic Energy Commission
Filed May 16, 1958, Ser. No. 735,895
7 Claims. (Cl. 204—193.2)

This invention relates to fissile materials of the ceramic type for use in fuel elements for neutronic reactors and to fuel elements embodying the fissile material.

Fuel elements comprising a fissile material enclosed in a suitable protective jacket or cladding are employed in neutronic reactors. The requirements for the fissile material employed are rigid.

The fissile material must possess good dimensional stability at elevated temperatures. Even minor dimensional changes of fuel elements because the fissile material changes will alter the required precise fuel element spacings and as a result these changes will adversely affect the proper and efficient operation of the neutronic reactor.

Furthermore, the fissile material should have good resistance to corrosion when employed in high temperature pressurized water type systems. If during reactor operation, a rupture should occur in the protective jacket the fissile material will become exposed to the high temperature water. Unless the fissile material is resistant to the corrosive and erosive action of this medium, a portion of the fissile material will enter and contaminate the circulating fluid system of the reactor and necessitate the emergency shutting down of the reactor for remedial procedures.

It is also important that the fissile material have a low capture cross-section for neutrons in an energy range in which the reactor is designed to operate.

The object of this invention is to provide a fissile material of the ceramic type for use in a fuel element for a neutronic reactor, which fissile material possesses good dimensional stability, good corrosion resistance and low capture cross-section for neutrons.

Another object of this invention is to provide a sintered compact consisting of specific amounts of zirconium dioxide, uranium dioxide and calcium oxide, which sintered compact is highly satisfactory as a fissile material for use in a fuel element for a neutronic reactor.

A further object of this invention is to provide a hermetically sealed enclosure having a plurality of spaced compartments therein and fissile material located in each of said compartments, said fissile material comprising at least one sintered compact formed by compacting and sintering a composite powdered composition consisting of zirconium dioxide, uranium dioxide and calcium oxide in certain specific proportions.

Other objects of this invention will, in part, be obvious and will, in part, appear hereinafter. For a better understanding of the nature and objects of this invention reference should be had to the following detailed description and drawing, in which the single figure is an exploded fragmentary view of a fuel element.

In accordance with this invention, there is provided a sintered ceramic-type composition of a fissile material suitable for use in a fuel element for a neutronic reactor, which sintered fissile material has good resistance to corrosion in high temperature pressurized water, good dimensional stability at elevated temperatures and good resistance to thermal shock.

The fissile material of this invention comprises a dense sintered compact of desired size and shape, which sintered compact is produced by compacting and sintering a composite powdered composition which consists of zirconium dioxide, uranium dioxide and calcium oxide in specified proportions.

Zirconium dioxide, which has a low capture cross-section for neutrons, is highly satisfactory for combination with uranium dioxide in the preparation of sintered compacts of fissile material. However, a sintered fissile material composed of uranium dioxide of desired enrichment and zirconium dioxide has little resistance to the corrosive action of high temperature pressurized water. In accordance with this invention, it has been discovered that by employing certain specific amounts of calcium oxide in admixture with uranium dioxide and zirconium dioxide, sintered compacts of fissile material can be prepared that have excellent resistance to the corrosive action of high temperature pressurized water. Furthermore, the sintered compacts of fissile material thus produced have good dimensional stability at elevated temperatures.

Briefly, this invention involves the preparation of a composite powdered composition consisting of zirconium dioxide, uranium dioxide and calcium oxide, which composite powdered composition is compacted and sintered to produce a hard, sintered compact of desired size and shape. The preparation of the composite powdered composition will be detailed hereinafter.

The composite powdered composition of this invention consists of, by weight, from about 64% to 75% of zirconium dioxide, from about 15% to 19% of uranium dioxide and from about 8% to 17% of calcium oxide. Composite powdered compositions consisting of, by weight, from 70% to 72% of zirconium dioxide, from 15% to 19% of uranium dioxide and from 11% to 13% of calcium oxide have produced sintered compacts possessing outstanding resistance to the corrosive action of high temperature pressurized water.

Broadly, the process of preparing the fissile material of this invention, employs cold pressing a composite powdered composition of desired ingredients to produce a compact of desired size and shape and the subsequent sintering of the compact to provide a sintered member of high density. The sintering operation is satisfactorily performed in air; however, it is preferred to sinter the compacts in a non-oxidizing atmosphere.

Briefly, the composite powdered composition of this invention is prepared by heating at elevated temperatures an intimate admixture of zirconium dioxide and calcium oxide, or a compound engendering calcium oxide when heated, in desired proportions to provide a solid solution of calcium oxide in zirconium oxide. The zirconium dioxide-calcium oxide solid solution is pulverized and intimately admixed with the desired amount of uranium dioxide powder. This admixture is heated at elevated temperatures and a solid solution type reaction takes place between the uranium dioxide and the zirconium dioxide-calcium oxide solid solution to produce a substantially uniform mass which is subsequently pulverized. The exact nature and extent of the reaction that takes place between the uranium dioxide and the zirconium dioxide-calcium oxide solid solution is not fully known. However, this reaction assists in providing substantially uniform dispersion of the uranium dioxide throughout the resulting sintered member of fissile material of this invention.

Calcium carbonate is conveniently employed as the source of calcium oxide in preparing the composite powdered mixtures of this invention. The amount of calcium carbonate employed will be 1.79 times the amount of calcium oxide desired in the final composite powdered mixture. Other sources for calcium oxide, such as calcium hydroxide, may be employed.

The desired amounts of zirconium dioxide and calcium carbonate, preferably in the form of fine powders, are thoroughly admixed and pressed into briquettes. The briquettes are placed in a furnace and heated at elevated temperatures for a period of time to convert the calcium carbonate to calcium oxide by driving off carbon dioxide and to produce a zirconium dioxide-calcium oxide solid solution. This operation is conveniently performed by heating the briquettes for about 16 hours in a furnace maintained at a temperature of at least about 1700° C. The briquettes are cooled to room temperature and pulverized into relatively fine powder.

The desired amount of uranium dioxide in powdered form is then added to the zirconium dioxide-calcium oxide solid solution and thoroughly admixed therewith to provide a powdered mixture.

The powdered mixture is pressed into briquettes and heated at elevated temperatures in a non-oxidizing atmosphere to cause the individual particles to react and to form a substantially uniform body. Temperatures of from about 1500° C. to 2000° C. are adequate for this purpose. Heating at these temperatures for about 14 to 18 hours is recommended. Heating in a non-oxidizing atmosphere is essential since the presence of oxygen will cause the uranium dioxide to oxidize to a higher oxide which is undesirable. The heated briquettes are cooled and then pulverized by ball milling or the like. The above briquetting and heating operation may be repeated if desired to insure adequate and uniform dispersion of the uranium dioxide throughout the composite product.

The final pulverizing operation is so conducted that the particles have an average size of from about 1 micron to 5 microns. The use of particles of this size enables the preparation of sintered compacts of high density. The sintered compacts of this invention will usually be about 95% of theoretical density, and higher.

The powder thus produced will consist of an intimate composition of zirconium dioxide, uranium dioxide and calcium oxide in the desired proportions. The three-component powdered composition is then agglomerated into free-flowing granules. In order to agglomerate the composite powdered composition, it is first mixed with a suitable binder and then mixed with water to form a wet mud-like mass. The wet mass is forced through a screen and dried to provide free-flowing granules. It is preferred to employ a 40 mesh screen for the screening operation. Any material which does not pass through the screen readily is forced through the screen.

The binder employed is a readily heat decomposable resinous type of binder so that in subsequent heat treating operations it is easily and readily removed. Binders of this type are well known in the art. A suitable binder for the purpose of this invention is polyethylene glycol. The amount of binder employed will usually be from about 1% to 3%, by weight, based on the weight of the composite powdered mixture to be agglomerated and the amount of water employed will be about 5% to 10%, by weight, based on the weight of the composite powdered mixture.

The free-flowing granules thus produced are compacted in a suitable die by cold pressing at pressures of from about 15 to 40 tons per square inch to produce a compact of desired size and shape. The compact is then sintered in air or in a non-oxidizing atmosphere such as hydrogen, argon or the like at a temperature of the order of about 1600° C. and higher until a density equal to about 95% of theoretical is achieved. Approximately 10 hours at 1700° C. is required to achieve the above density. The resinous binder is removed by evaporation and pyrolysis from the compact during the sintering operation.

The rates of heating and cooling the compacts during and after the sintering operation should be moderate enough to prevent the cracking or spalling of the compacts, and the compacts should not be removed from the non-oxidizing atmosphere until the temperature has dropped below about 100° C. During sintering, the compacts should be contained in non-reactive refractory trays. Molybdenum metal trays are recommended.

The following specific example illustrates a method of preparing the sintered compacts of this invention.

Example I

One hundred ninety grams of zirconium dioxide powder are thoroughly admixed with 45.6 grams of finely divided calcium carbonate both passing a 100 mesh screen. The powdered mixture is placed in a .615 inch by 1.2 inches die and cold pressed at a pressure of 14 tons per square inch to produce briquettes. The briquettes are placed in a furnace and heated at a temperature of about 1650° C. for about 14 hours, cooled to room temperature and pulverized into fine particles passing through a 200 mesh sieve.

The pulverized zirconium dioxide-calcium oxide solid solution produced weighs about 165.8 grams and is thoroughly admixed with 29.3 grams of enriched uranium dioxide powder (200 mesh). This mixture is placed in a .71 inch by 2.12 inches die and cold pressed into a briquette by the application of pressure of 6.6 tons per square inch. The briquette thus produced is heated at a temperature of about 1725° C. in an atmosphere of hydrogen for 14 hours, cooled to room temperature in the hydrogen atmosphere and pulverized below 200 mesh fineness.

The pulverized material is again briquetted in a .71 inch x 2.12 inches die at a pressure of about 8 tons per square inch. The briquette thus produced is heated in an atmosphere of hydrogen for about 16 hours at a temperature of about 1710° C. The briquette is cooled to room temperature in the hydrogen atmosphere and again pulverized.

The pulverized material is ball-milled in a rubber lined mill using $3/16$ inch diameter uranium cylinders. The pulverized material is ball-milled until substantially all the fine particles produced have an average particle size of from about 1 micron to 5 microns.

The finely divided material is agglomerated into a wet mass by adding thereto 1%, by weight, of polyethylene glycol and 7.5%, by weight, of water and mixing. The agglomerated mass thus produced is forced through a 40 mesh screen to produce granules. The granules are dried to remove the water.

The dried granules are placed in a .715 inch square die and cold pressed at a pressure of about 20 tons per square inch to produce a square compact having a thickness of about 1/10 inch. The compact is then sintered in a hydrogen atmosphere at a temperature of 1770° C. for about 40 hours. The resulting sintered compact consists of, by weight, about 73% of zirconium dioxide, about 15% of uranium dioxide and about 12% of calcium oxide, and has a density of about 98.7% of theoretical density.

The sintered compacts of this invention in the form of thin platelets are satisfactorily employed as the fissile material or "meat" in the compartmented type fuel elements described and claimed in application Serial No. 731,801, filed April 29, 1958, and assigned to the assignee of the present invention.

A compartmented fuel element of the type described in application Serial No. 731,801 is shown in the single figure of the drawing. The fuel element 10 comprises a central filler plate 12 provided with a plurality of compartments 14 and a pair of cladding plates 16. The cladding plates 16 and the filler plate 12 are preferably constructed of a material which has sufficient structural strength and a low neutron absorption cross section such, for example, as zirconium or a zirconium alloy, stainless steel or combinations thereof. A very satisfactory zirconium alloy for this purpose is that disclosed in U.S. Patent 2,772,964, issued December 4, 1956 and assigned to the assignee of the present invention.

To fabricate the fuel element 10, one cladding plate 16 is secured to one side of the filler plate 12. Fissile material 18 comprising a sintered compact of this invention in the form of a platelet or wafer is located in each of the compartments 14 and the cladding plate 16 is secured to the other side of the filler plate 12. If the compartments 14 should be of such a size that it is not practical to produce a single platelet of fissile material for insertion therein, then small platelets of practical size are prepared and two or more such platelets, as required, are inserted in the individual compartments. For a fuller description of the details of these compartmented type fuel elements and their method of fabrication, reference is hereby made to application Serial No. 731,801.

To illustrate the outstanding corrosion resistances of the fissile material of this invention, two sintered compacts were prepared in accordance with the method set forth in Example I. The sintered compacts consist of about 72% zirconium dioxide, 13% calcium oxide and 15% uranium dioxide. One compact was subjected to 750° F. steam at a pressure of 2000 p.s.i. for 72 hours. The compact did not disintegrate and showed an extremely low corrosion rate as evidenced by the fact that the weight loss was of the order of about 1.2 milligrams per square centimeter during the 72 hour period. The second sintered compact was immersed in 650° F. of water for a period of 7 days. The amount of corrosion was small as evidenced by the weight loss of about 0.5 milligrams per square centimeter during this time.

Tests were made to determine the dimensional stability of the fissile material of this invention. Two sintered compacts consisting of, by weight, 70% of zirconium dioxide, 13% calcium oxide and 17% uranium dioxide were prepared in accordance with the method of Example I. Both compacts were subjected to test conditions similar to that encountered in a pressurized water reactor. The sintered compacts showed no dimensional changes as a result of these tests.

The fissile material of this invention may also be fabricated in the form of cylindrical rods and employed as the fissile material in the composite fuel element described in application Serial No. 584,828 filed May 14, 1956 and assigned to the assignee of the present invention.

Further, in accordance with this invention, it has been determined that a sintered compact consisting of, by weight, from 15% to 22% of uranium dioxide and from 78% to 85% of aluminum oxide can be prepared in a manner similar to that described hereinbefore with reference to the preparation of sintered compacts consisting of uranium dioxide, zirconium dioxide and calcium oxide. Such sintered compacts are satisfactory for use as a fissile material in a fuel element for a neutronic reactor.

Briefly, the method of producing sintered compacts of uranium dioxide and aluminum oxide comprises admixing the desired amount of uranium dioxide powder and the desired amount of aluminum oxide powders and then ball milling the powder to reduce their particle size and to prepare an intimate mixture of the powders. The fine particle sizes provide for high densities in the sintered compact.

The powdered mixture is agglomerated by adding thereto the desired amount of binder material and granules are prepared therefrom. The granules are placed in a suitable die and dry pressed at high pressures to form a compact of desired size and shape. The compact is then sintered in a non-oxidizing atmosphere at a temperature of about 1700° C. for a period of time sufficient to produce a sintered compact of high density.

Fissile material comprising a sintered compact of the aluminum oxide and uranium dioxide powders has high strength, good thermal shock resistance and good thermal conductivity.

It will be understood that the above description and drawing are illustrative and not in limitation of the invention.

I claim as my invention:

1. Fissile material adapted for use in a fuel element for a neutronic reactor comprising a sintered compact consisting of, by weight, from 64% to 75% of zirconium dioxide, from 15% to 19% of uranium dioxide and from 8% to 17% of calcium oxide.

2. Fissile material adapted for use in a fuel element for a neutronic reactor comprising a sintered compact consisting of, by weight, from 70% to 72% of zirconium dioxide, from 15% to 19% of uranium dioxide and from 11% to 13% of calcium oxide.

3. Fissile material adapted for use in a fuel element for a neutronic reactor comprising a sintered compact consisting of the reaction product of a mixture of, by weight, from 64% to 75% of zirconium dioxide, from 15% to 19% of uranium dioxide and from 8% to 17% of calcium oxide.

4. Fissile material adapted for use in a fuel element for a neutronic reactor comprising a sintered compact formed by sintering at a temperature above about 1600° C. a composite powdered mixture consisting of the reaction product of, by weight, from 64% to 75% of zirconium dioxide, from 15% to 19% of uranium dioxide and from 8% to 17% of calcium oxide.

5. A fuel element suitable for use in a neutronic reactor comprising a flat filler plate constructed of a material having a low thermal neutron cross section and having a plurality of compartments therein spaced from the outer edges thereof, a fissile material comprising at least one sintered compact consisting of, by weight, from 64% to 75% of zirconium dioxide, from 15% to 19% of uranium dioxide and from 8% to 17% of calcium oxide located in each of said compartments, a pair of cladding plates formed of the same material as said filler plate secured thereto and cooperating therewith to totally enclose said fissile material in said compartments.

6. A hermetically sealed enclosure constructed of a material having a low thermal neutron cross section and having a plurality of spaced compartments therein and fissile material located in each of said compartments, said fissile material comprising at least one sintered compact consisting of, by weight, from 64% to 75% of zirconium dioxide, from 15% to 19% of uranium dioxide and from 8% to 17% of calcium oxide.

7. A fuel element suitable for use in a neutronic reactor comprising a flat filler plate formed from a material selected from the group consisting of aluminum, stainless steel, zirconium and zirconium alloys and having a plurality of spaced compartments therein, fissile material located in each of the said compartments, a pair of cladding plates formed of the same material as the said filler plate secured thereto and cooperating therewith to hermetically enclose the fissile material, said fissile material comprising at least one sintered compact consisting of, by weight, from 64% to 75% of zirconium dioxide, from 15% to 19% of uranium dioxide and from 8% to 17% of calcium oxide.

References Cited in the file of this patent

UNITED STATES PATENTS

| | | |
|---|---|---|
| 2,490,825 | Mochel | Dec. 13, 1949 |
| 2,499,729 | Daussan | Mar. 7, 1950 |
| 2,798,848 | Kingdon | July 9, 1957 |
| 2,799,642 | Hurwitz et al. | July 16, 1957 |

OTHER REFERENCES

WAPD–MRP–67, PWR Project report for Feb. 24, 1957, April 23, 1957, pp. 42–43.

WAPD–MRP–68, PWR Project report for April 24, 1957, June 23, 1957, pp. 79–83.